UNITED STATES PATENT OFFICE.

HENRY CHAPMAN, OF PHILADELPHIA, PENNSYLVANIA, ASSIGNOR TO HIMSELF AND SYLVESTER W. BURLEY, OF SAME PLACE.

IMPROVEMENT IN FOOD FOR HORSES AND CATTLE.

Specification forming part of Letters Patent No. 150,526, dated May 5, 1874; application filed April 27, 1874.

*To all whom it may concern:*

Be it known that I, HENRY CHAPMAN, of Philadelphia, Pennsylvania, have invented an Improved Feed for Horses and Cattle, of which the following is a specification:

The object of my invention is to preserve brewers' grains by pressing, drying, and salting, as fully described hereafter, so as to convert the said grains into a valuable feed which is suitable for horses and cattle, and which can be stored and transported to distant points, or exposed without liability to deterioration.

Brewers' grains are the refuse of malt which has been crushed and steeped, and washed and rewashed, until all of the matter which is available to the brewer has been extracted. Such grains contain a large percentage of nutritious matter, and are readily sold to farmers and others in the vicinity of the breweries, in the winter season, as food for horses and cattle. In summer, however, the grains become sour and unfit for use in a few hours after leaving the brewery; but even if sweet, there would be little sale for them at this season, when grass and other food is cheap and abundant. The grains, in fact, in the summer season, are a nuisance, the removal of which demands expensive hauling, for if permitted to accumulate in large quantities they become putrid and very offensive.

By my invention, which I will now proceed to describe, I convert these useless grains into a valuable article of commerce. I subject the grains, immediately after removing them from the brewers' vats, to pressure, and thus extract the greater portion of the water. I then thoroughly salt the partially-dried grains in any suitable mixing-vessel, which not only aids in their preservation, but renders them more palatable for cattle; and I finally spread the grains in thin layers upon the floors of a suitable kiln, and thus thoroughly dry them, which completes the operation.

The grains thus preserved retain all their nutritious properties, and can be kept for any length of time, transported to distant points, and subjected to any temperature or climate without deterioration.

They may be packed in bags, or stored or transported in bulk, as may be found most convenient.

I claim as my invention, and as a new article of commerce—

Brewers' grains pressed, salted, and dried, all substantially as herein described.

In testimony whereof I have signed my name to this specification in the presence of two subscribing witnesses.

HENRY CHAPMAN.

Witnesses:
WM. A. STEEL,
HARRY SMITH.